United States Patent
Ban et al.

(10) Patent No.: US 7,203,580 B2
(45) Date of Patent: Apr. 10, 2007

(54) ELECTRICAL CONTROL UNIT AND CONTROL SYSTEM COMPRISING PLURAL ELECTRICAL CONTROL UNITS

(75) Inventors: Yoshinori Ban, Kariya (JP); Koukichi Shimizu, Kariya (JP); Masahiro Sato, Hazu-gun (JP)

(73) Assignee: Denso Corporation, Kariya, Aichi-pref. (JP)

( * ) Notice: Subject to any disclaimer, the term of this patent is extended or adjusted under 35 U.S.C. 154(b) by 448 days.

(21) Appl. No.: 10/775,241

(22) Filed: Feb. 11, 2004

(65) Prior Publication Data

US 2004/0162653 A1    Aug. 19, 2004

(30) Foreign Application Priority Data

Feb. 19, 2003  (JP)  ............................. 2003-041628

(51) Int. Cl.
*G06F 7/00* (2006.01)
*G06F 19/00* (2006.01)

(52) U.S. Cl. ...................... 701/29; 701/36; 701/114; 701/102; 123/396; 123/399; 123/480; 714/719; 714/722; 73/116

(58) Field of Classification Search ................ 701/29, 701/102, 114; 714/719, 722; 123/480; 73/116

See application file for complete search history.

(56) References Cited

U.S. PATENT DOCUMENTS

| | | | | |
|---|---|---|---|---|
| 2,235,803 A | * | 3/1941 | Carpenter | 379/32.04 |
| 4,339,801 A | * | 7/1982 | Hosaka et al. | 701/102 |
| 4,455,654 A | * | 6/1984 | Bhaskar et al. | 714/28 |
| 4,639,901 A | * | 1/1987 | Warmack et al. | 367/13 |
| 4,931,855 A | * | 6/1990 | Salvadorini | 375/240.25 |
| RE33,287 E | * | 8/1990 | Allen | 244/3.11 |
| 5,091,938 A | * | 2/1992 | Thompson et al. | 380/239 |
| 5,166,976 A | * | 11/1992 | Thompson et al. | 380/225 |
| 5,185,794 A | * | 2/1993 | Thompson et al. | 380/235 |
| 5,267,312 A | * | 11/1993 | Thompson et al. | 380/237 |
| 5,406,627 A | * | 4/1995 | Thompson et al. | 380/237 |
| 5,416,780 A | * | 5/1995 | Patel | 370/347 |
| 5,463,762 A | * | 10/1995 | Morrissey et al. | 714/49 |
| 5,689,502 A | * | 11/1997 | Scott | 370/281 |
| 5,745,484 A | * | 4/1998 | Scott | 370/347 |

(Continued)

FOREIGN PATENT DOCUMENTS

CN    1439973 A    *    9/2003

(Continued)

OTHER PUBLICATIONS

Neil Brown et al., An acoustic current meter update (3D-ACM), presented at Oceanology International 1998, Brighton, U.K.*

(Continued)

*Primary Examiner*—Cuong Nguyen
(74) *Attorney, Agent, or Firm*—Nixon & Vanderhye P.C.

(57) ABSTRACT

When ENG frames created in an ENG transceiver unit and ECT frames subjected to gateway processing in an ECT gateway processor are transmitted around the same time, a transmission mediating unit alternately transmits each of the ENG frames and the ECT frames. Therefore, as compared with a case where one type of frames are preferentially transmitted, transmission of both types of frames can be started at the earliest timing.

13 Claims, 7 Drawing Sheets

U.S. PATENT DOCUMENTS

| | | | | |
|---|---|---|---|---|
| 5,802,046 | A * | 9/1998 | Scott | 370/280 |
| 5,867,283 | A * | 2/1999 | Nam | 358/498 |
| 5,959,980 | A * | 9/1999 | Scott | 370/280 |
| 6,049,538 | A * | 4/2000 | Scott | 370/347 |
| 6,094,421 | A * | 7/2000 | Scott | 370/280 |
| 6,112,152 | A * | 8/2000 | Tuttle | 701/115 |
| 6,213,879 | B1 * | 4/2001 | Niizuma et al. | 463/36 |
| 6,289,006 | B1 * | 9/2001 | Schobl | 370/330 |
| 6,324,603 | B1 * | 11/2001 | Niizuma et al. | 710/72 |
| 6,338,105 | B1 * | 1/2002 | Niizuma et al. | 710/72 |
| 6,366,566 | B1 * | 4/2002 | Scott | 370/280 |
| 6,381,239 | B1 * | 4/2002 | Atkinson et al. | 370/362 |
| 6,388,997 | B1 * | 5/2002 | Scott | 370/280 |
| 6,522,634 | B1 * | 2/2003 | Ohashi | 370/280 |
| 6,559,671 | B2 * | 5/2003 | Miller et al. | 324/765 |
| 6,732,044 | B2 * | 5/2004 | Hashimoto et al. | 701/114 |
| 2003/0086226 | A1 * | 5/2003 | Hashimoto et al. | 361/91.1 |
| 2003/0158649 | A1 * | 8/2003 | Hashimoto et al. | 701/114 |
| 2003/0221668 | A1 * | 12/2003 | Hashimoto et al. | 123/396 |

FOREIGN PATENT DOCUMENTS

| | | | |
|---|---|---|---|
| CN | 1231851 C | * | 12/2005 |
| GB | 2046964 | * | 9/1983 |
| GB | 2273484 | * | 8/1996 |
| JP | 1-270161 | | 10/1989 |
| JP | 2-114745 | | 4/1990 |
| JP | 6-89258 | | 3/1994 |
| JP | 7-69093 | | 3/1995 |
| JP | 7-319802 | | 12/1995 |
| JP | 2000-298644 | | 10/2000 |
| JP | 2002-325085 | | 11/2002 |

OTHER PUBLICATIONS

Anderson et al., Processor-Based Tester Goes on Site to Isolate Board Faults Automatically, Electronics, May 11, 1978, pp. 111-117.*

Unknown author, N-Up Test Adapter, IBM Techniocal Disclosure, Bulletin, vol. 39, No. 7 (Jul. 1996), pp. 243-244.*

Donald L. Stivender, Engine Air Controller—Basis of a Vehicular Systems Control Hierarchy, Society of Automotive Engineers, Inc. 1978.*

* cited by examiner

SINGLE FRAME

| #0 | #1 | #2 | #3 | #4 | #5 | #6 | #7 |
|---|---|---|---|---|---|---|---|
| PCI | DIAGNOSTIC DATA | | | | | | |

FIG. 2B

| | #0 | #1 | #2 | #3 | #4 | #5 | #6 | #7 |
|---|---|---|---|---|---|---|---|---|
| FIRST FRAME | PCI | | DIAGNOSTIC DATA | | | | | |
| CONSECUTIVE FRAME | PCI | DIAGNOSTIC DATA | | | | | | |

FIG. 2C

FLOW CONTROL FRAME

| #0 | #1 | #2 | #3 | #4 | #5 | #6 | #7 |
|---|---|---|---|---|---|---|---|
| PCI | | | UNUSED | | | | |

ELECTRICAL CONTROL UNIT AND CONTROL SYSTEM COMPRISING PLURAL ELECTRICAL CONTROL UNITS

CROSS REFERENCE TO RELATED APPLICATION

This application is based upon, claims the benefit of priority of, and incorporates by reference the contents of Japanese Patent Application No. 2003-41628 filed on Feb. 19, 2003.

FIELD OF THE INVENTION

The present invention relates to a control system for a first electrical control unit and a second electrical control unit connected to each other through a dedicated bus and, more particularly, to a control system for making arbitration optimally when the first and second electrical control units transmit messages through the common bus around the same time.

BACKGROUND OF THE INVENTION

A vehicle control system may include an electrical control unit (ENG ECU) for controlling the driving state of the engine of a vehicle and an electrical control unit (ECT ECU) for controlling an automatic transmission of the vehicle. This vehicle control system uses a dedicated bus through which ENG ECU and ECT ECU are connected to each other because the communication data amount between ENG ECU and ECT ECU is large. Accordingly, the communication load imposed on a common bus to which other electrical control units (ECUs for brake, suspension, air bag, etc.), etc. are connected can be reduced.

An abnormality diagnostic device may be connected to the common bus in the above control system. When the abnormality diagnostic device generates a message concerning an abnormality diagnosis from each ECU, the ENG ECU is required to apply gateway processing to a communication frame for transmitting the message from the ECT ECU so that the communication frame is transmitted from the dedicated bus to the common bus.

Furthermore, the ENG ECU is required to not only apply the gateway processing to the communication frame from the ECT ECU, but also transmit a communication frame representing a message created by itself through the common bus to the abnormality diagnostic device. In this case, if the ENG ECU preferentially transmits its own communication frame corresponding to the message created and then carries out the gateway processing on the communication frame from ECT ECU, the transmission timing of the message from the ECT ECU will be delayed.

The transmission time in the abnormality diagnosis operation is defined by the ISO15031-5 standard or the like. Accordingly, it is necessary to transmit a first transmission frame within 50 ms at the latest from the time when a message transmitting request is made from the abnormality diagnostic device.

However, when priority is given to the transmission processing of the message of the ENG ECU as described above, there may occur a case where it is impossible to transmit the message from the ECT ECU within the time set by the standard in accordance with the length of the message.

SUMMARY OF THE INVENTION

The present invention has been implemented in view of the foregoing description, and has a first object to provide an electrical control unit which can mediate the transmission processing of a communication frame created by itself and the gateway processing of a communication frame created by another electrical control unit and thus transmit these communication frames with no time delay.

Furthermore, the present invention has a second object to provide a control system designed so that a first electrical control unit and a second electrical control unit are connected to each other through a dedicated bus and also only the first electrical control unit is connected to a common bus. When the first and second electrical control units transmit the communication frames corresponding to the respective messages through the common bus around the same time, the control system is able to transmit the communication frames from the first and second electrical control unit with no time delay.

In order to attain the above first object, according to a first aspect of the present invention, there is provided an electrical control unit comprising: a communication frame creating unit for creating at least one communication frame in conformity with a message to be transmitted; a storage unit for temporarily storing at least one communication frame transmitted from another electrical control unit, the at least one communication frame concerned being subjected to gateway processing; and a transmission mediating unit for alternately transmitting the at least one communication frame created in the communication frame creating unit and the at least one communication frame stored in the storage unit through a bus to the outside.

As described above, in the electrical control unit according to the first aspect, when the communication frame created in the communication frame creating unit and the communication frame to be subjected to the gateway processing compete with each other, these communication frames are alternately transmitted through the bus. Therefore, the transmission of both the communication frames can be started at the most early timing as compared with the case where the transmission of one communication frame is preferentially carried out.

According to a second aspect of the present invention, the communication frame creating unit sets a code representing the content of an abnormality detected by an abnormality diagnosis as a message and creates at least one communication frame corresponding to the message. With respect to a message creating request from an abnormality diagnostic device (exterior unit), the response time thereof is settled by the standard. Therefore, the communication frame can be transmitted with no time delay when a code representing abnormality content is transmitted as a message.

According to a third aspect of the present invention, the electrical control unit controls in-vehicle mount equipment mounted in a vehicle, and the communication frame creating unit may set a signal representing the state of the in-vehicle mount equipment as a message and creates at least one communication frame corresponding to the message. This message may be used to check the operational state of the in-vehicle mount equipment or research the cause of the abnormality independently of the code representing the abnormality content or by achieving the state of the in-vehicle mount equipment when abnormality occurs.

Next, in order to attain the above second object, according to a fourth aspect of the present invention, a control system is equipped with a first electrical control unit connected to a first bus and a second electrical control unit connected to the first electrical control unit through a second bus, each of the first and second electrical control units creating at least one communication frame corresponding to a message to be transmitted in response to a received external message creating request (received from an external unit) and transmitting the at least one communication frame concerned through the first bus, wherein the first electrical control unit is equipped with a transmission mediating unit for alternately transmitting the at least one communication frame created by the first electrical control unit and the at least one communication frame created by the second electrical control unit when the at least one communication frame created by the first electrical control unit and the at least one communication frame which is created by the second electrical control unit and transmitted to the first electrical control unit through the second bus are transmitted through the first bus around the same time.

As described above, the control system according to the fourth aspect is equipped with the transmission mediating unit for alternately transmitting the at least one communication frame created by the first electrical control unit and the at least one communication frame created by the second electrical control unit. Therefore, the transmission of each of the communication frames created by the first and second electrical control units can be started at the most early timing thereof.

According to a fifth aspect of the present invention, an exterior unit for outputting a message creating request is connected to the first bus, and each of the first and second electrical control units may be designed so as to create at least one communication frame corresponding to a message to be transmitted when receiving the message creating request from the exterior unit through the first bus. Accordingly, desired information can be achieved from the first and second electrical control units by merely connecting an external unit such as an abnormality diagnostic device or the like to the first bus.

Furthermore, according to a sixth aspect of the present invention, when the exterior unit makes a request for creating a message concerning an abnormality diagnosis result to the first and second electrical control units, each of the first and second electrical control units transmits a code representing the abnormality content detected by abnormality diagnosis as a message. As described above, with respect to the message creating request by the abnormality diagnostic device, the response time thereof is settled. Even in such a case, due to the transmission mediating unit, the control system of the present invention can start the transmission of the communication frames created by the first and second electrical control units with no time delay. Accordingly, the present invention is suitably applicable particularly to the case where a code representing an abnormality content is transmitted as a message.

According to a seventh aspect of the present invention, the first and second electrical control units may be constructed as an electrical control unit for controlling the driving state of the engine of a vehicle and an electrical control unit for controlling an automatic transmission of the vehicle. The control unit for the engine and the control unit for the automatic transmission are preferably connected to each other through a dedicated bus because the mutual data communication amount therebetween is large.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE DRAWINGS

Preferred embodiments according to the present invention will be described with reference to the accompanying drawings.

A control system according to a preferred embodiment of the present invention will be described with reference to the accompanying drawings. In the following description, the control system is described as being equipped with an electrical control unit for the engine of a vehicle (ENG ECU) and an electrical control unit for a transmission (ECT ECU). However, the control system of the present invention is applicable to other electrical control units of the vehicle or electrical control units of equipment other than the vehicle. Generally, the control system is applicable to electrical control units for controlling in-vehicle mount equipment mounted in a vehicle.

Figure 1:
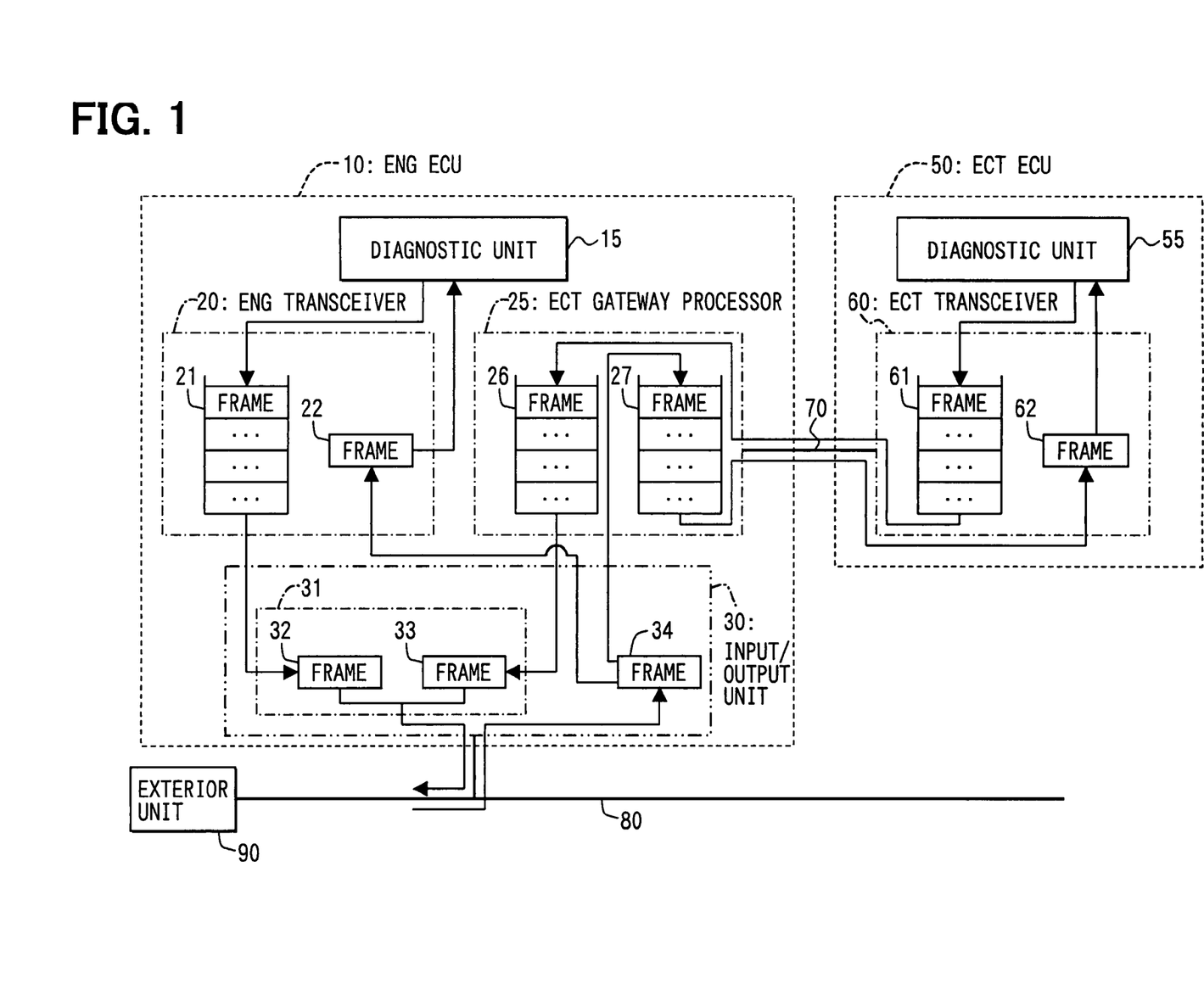
FIG. 1 is a block diagram of a control system according to a preferred embodiment.

Referring to FIG. 1, the control system is equipped with an electrical control unit for an engine (ENG ECU) 10 and an electrical control unit for a transmission (ECT ECU) 50. The ENG ECU 10 and ECT ECU 50 are connected to each other through a dedicated bus 70.

ENG ECU 10 controls the fuel a mount injected by an injector and an injecting timing on the basis of detection signals of various kinds of sensors such as an $O_2$ (oxygen) sensor equipped to an exhaust pipe of the engine, a water temperature sensor for detecting the temperature of cooling water for the engine, a vehicle speed sensor for detecting the running speed of the vehicle, a rotation number sensor for detecting the rotation number of the engine, an air flow sensor for detecting the amount of air sucked into the engine, a throttle position sensor for detecting the opening degree of a throttle valve, etc. The control on the fuel injection amount and the injection timing by ENG ECU 10 is well known, and thus the parts of the various kinds of sensors, the injector, etc. are omitted from the illustration.

ECT ECU 50 controls the gear position of the transmission on the basis of the rotation number of the engine, the opening degree of the throttle valve, the running speed of the vehicle, etc. The control of the transmission is also well known, and thus the parts associated with the transmission are omitted from FIG. 1. The detection signals of the various kinds of sensors are transmitted from ENG ECU 10 to ECT ECU 50 or from ECT ECU 50 to ENG ECU 10 through the dedicated bus 70.

ENG ECU 10 and ECT ECU 50 of this embodiment perform the above control, and also they are respectively equipped with diagnostic units 15, 55 for performing an abnormality diagnosis processing in which the sensors and the parts described above are checked to determine if the are operating normally. Also, the memory in each ECU and the programs, etc. stored in the memory are checked to determine if the are operating normally. Each of the diagnostic units 15, 55 carries out the abnormality diagnosis processing periodically. When an abnormality is found by the diagnosis processing, a diag-code which is associated with both the place of the abnormality and the content of the abnormality is stored into a non-volatile memory (not shown). In addition to the diag-code, the operation state of an engine or automatic transmission as a control target of each ECU, such as the rotation number of the engine or the like is also stored in the memory.

The engine ECU 10 is also connected to the common bus 80 to which the other control units than ECT ECU 50, etc. are connected. An external unit 90 such as an abnormality diagnostic device or the like may be connected to the common bus 80. When the abnormality diagnostic device 90 is connected to the common bus 80, the abnormality diagnostic device 90 outputs a message creating request to each ECU, including the ENG ECU 10 and the ECT ECU 50, so that a code representing an abnormality content which is detected through abnormality diagnosis is transmitted as a message from each ECU. Each of the ENG ECU 10 and ECT ECU 50 corresponds to a communication frame creating unit. Upon receiving this message creating request, each of ENG ECU 10 and ECT ECU 50 creates the communication frame corresponding to the diag-code stored in the non-volatile memory, and transmits the communication frame thus created to the abnormality diagnostic device 90 through the common bus 80.

Furthermore, in addition to the code representing the abnormality content, each of ENG ECU 10 and ECT ECU 50 also creates a communication frame concerning a signal representing the present operation state of the engine or automatic transmission to be controlled (for example, the rotation number of the engine or the like), and transmits the communication frame thus created to the abnormality diagnostic device 90.

A mechanism for receiving the message creating request and a mechanism for creating and transmitting the communication frame corresponding to the diag-code or the like in ENG ECU 10 and ECT ECU 50 will be described hereunder.

As shown in FIG. 1, ENG ECU 10 is equipped with an input/output unit 30 connected to the common bus 80. The input/output unit 30 comprises a reception buffer 34 for temporarily storing the communication frame transmitted through the common bus 80 to ENG ECU 10 or ECT ECU 50, and a transmission mediating unit 31 for mediating the communication frames created in ENG ECU 10 and ECT ECU 50 to output them to the common bus 80. The transmission mediating unit 31 comprises an ENG buffer 32 for temporarily storing the communication frame created in ENG ECU 10, and an ECT buffer 33 for temporarily storing the communication frame created in ECT ECU 50.

Here, a communication frame refers to a unit of data transmitted/received through the dedicated bus 70 and the common bus 80. In this embodiment, the data length of the communication frame is fixed to 8 bytes. The details of the communication frame will be described later.

Each frame includes an ID indicating a transmission source and a transmission destination. Accordingly, with respect to the communication frame received by the reception buffer 34, it is identifiable on the basis of the ID concerning which one of ENG ECU 10 and ECT ECU 50 the communication frame concerned is addressed to or whether the frame communication concerned is addressed to both of ENG ECU 10 and ECT ECU 50 or not, and the input/output unit 30 switches the transmission destination on the basis of the identification result.

ENG ECU 10 is equipped with an ENG transceiver unit 20 (or transmitting/receiving unit) having a transmission buffer 21 and a reception buffer 22. The ENG transceiver unit 20 plays the following role with respect to the transmission/reception of the communication frame between the diagnostic unit 15 and the input/output unit 30.

First, when the ENG transceiver unit 20 transmits a code representing an abnormality content detected by the diagnostic unit 15 as a message, the ENG transceiver unit 20 divides the message on a communication-frame basis so that the message can be transmitted through the common bus 80. When the message to be transmitted is less than 8 bytes, a single communication frame is created. When the message is divided into plural communication frames, the communication frames thus achieved are successively accumulated in the transmission buffer 21. The transmission buffer 21 is an FIFO (First In First Out) type buffer. Therefore, the communication frames are successively accumulated in the transmission buffer 21 in the creating order thereof, and successively transmitted one by one to the ENG buffer 32 of the transmission mediating unit 31 in the accumulating order from the communication frame accumulated at the earliest time.

The ENG transceiver unit 20 is equipped with a reception buffer 22 for receiving the communication frames stocked in the reception buffer 34 of the input/output unit 30 one by one. The ENG transceiver unit 20 fabricates one message from the communication frames received from the reception buffer 22, and transmits the message thus achieved to the diagnostic unit 15.

Furthermore, ENG ECU 10 is equipped with a gateway processor 25 for transmitting the communication frame addressed to ECT ECU 50 through the dedicated bus 70 to ECT ECU 50, and also applying gateway processing to the communication frame output from ECT ECU 50 to output the communication frame to the common bus 80. The gateway processor 25 is equipped with an FIFO type transmission buffer 26 and an FIFO type reception buffer 27. The communication frames accumulated in the reception buffer 27 are successively transmitted to ECT ECU 50 one by one in the accumulating order from the communication frame accumulated at the earliest time. The transmission buffer 26 for accumulating the communication frames transmitted from ECT ECU 50 successively transmits the communication frames to the ECT buffer 33 of the transmission mediating unit 31 one by one from the communication frame accumulated at the earliest time.

ECT ECU 50 is equipped with an ECT transceiver unit 60 for carrying out the transmission/reception processing of the communication frame to be transmitted/received through the dedicated bus 70. The ECT transceiver unit 60 has the same function as the ENG transceiver unit 20 of ENG ECU 10, and is equipped with a transmission buffer 61 and a reception buffer 62.

Next, the communication frame will be described in detail with reference to FIGS. 2A to 2C. As described above, the communication frame has a fixed data length of 8 bytes. However, the communication frames are classified into four types as shown in FIGS. 2A to 2C, and the maximum number of bytes usable for transmission of the diag-code varies in accordance with the type of communication frames.

Figure 2A:
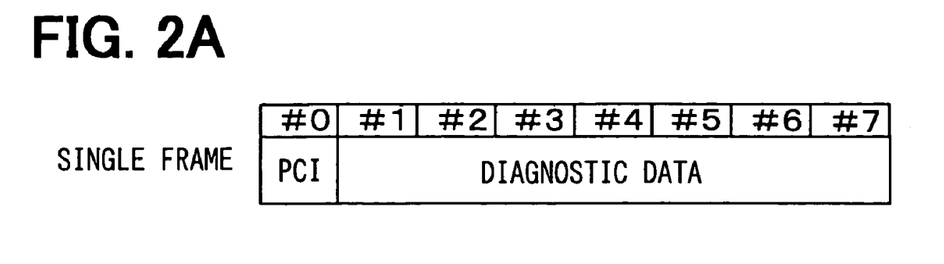
FIG. 2A is an illustration of the frame structure of a single frame SF as a first type of a communication frame.

First, FIG. 2A shows the structure of a single frame SF as a first type of communication frames. The single frame SF is defined as a communication frame used when diag-data to be transmitted is less than 8 bytes and it is unnecessary to divide the communication frame into plural frames for transmission. Protocol control information (PCI) is written in the first one byte in the single frame SF. In the case of the single frame SF, PCI mainly represents the length of the diag-data (#1 to #7). Each type of diag-data basically has a data length of 2 bytes. Accordingly, when the number of diag-codes to be transmitted is not more than 3, they can be transmitted with a single frame SF.

Figure 2B:
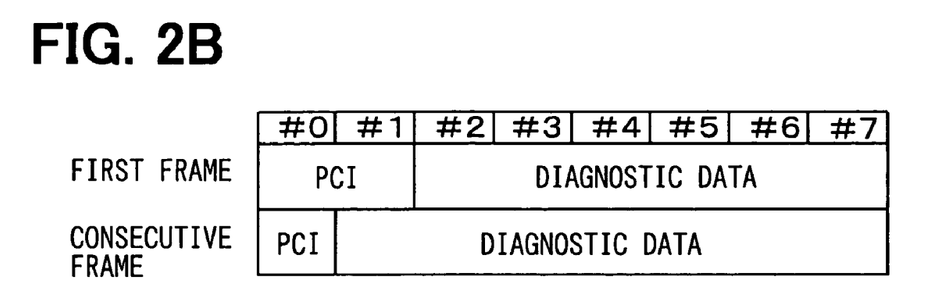
FIG. 2B is an illustration of the frame structures of a first frame FF and a consecutive frame CF as second and third types of the communication frame.
Figure 2C:
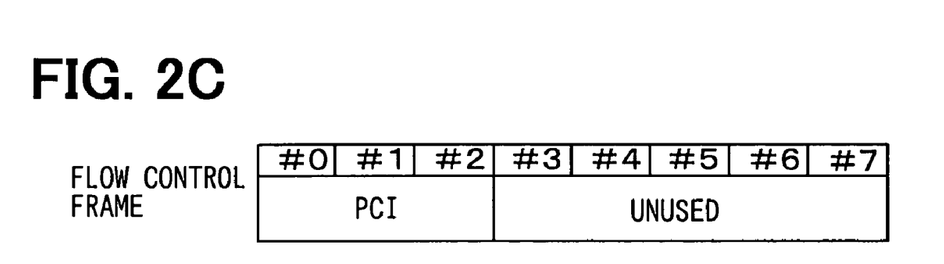
FIG. 2C is an illustration of the frame structure of a front control frame FC as a fourth type of the communication frame.

FIG. 2B shows the structure of a first frame FF and the structure of a consecutive frame CF as second and third types of the communication frames, and FIG. 2C shows the structure of a flow control frame FC as a fourth type of the communication frames. The communication frames shown in FIGS. 2B and 2C are used when the length of a diag-data to be transmitted is not less than 8 bytes.

The first frame FF is a frame to be first transmitted when the diag-data is transmitted while divided into plural communication frames, and the consecutive frame CF is a frame used as a second or subsequent frame to be transmitted subsequently to the first frame FF. In the first frame FF, two bytes are allocated to PCI to indicate the data length of the whole diag-data as shown in FIG. 2B. Accordingly, the maximum transmissible data length of diag-data in the first frame FF is equal to 6 bytes. On the other hand, in the consecutive frame CF, one byte is allocated to PCI because each consecutive frame is mainly represented with a serial number (1→2→ . . . →F→0→1→ . . . ) by PCI.

The flow control frame FC shown in FIG. 2C is a frame to be transmitted from a reception side to a transmission source when the reception side receives a first frame FF. The flow control frame FC comprises only PCI data, and the PCI of the flow control frame FC transmits the maximum number of frames to be divisionally transmitted from the transmission side after the transmission side receives the flow control frame FC, the minimum transmission interval, etc.

Next, the processing executed by ENG ECU 10 and ECT ECU 50 when a message creating request is output from the abnormality diagnostic device 90 to ENG ECU 10 and ECT ECU 50 so that a code representing an abnormality content detected through abnormality diagnosis is transmitted as a message will be described with reference to the flowchart of FIGS. 3 to 6B.

Figure 3:
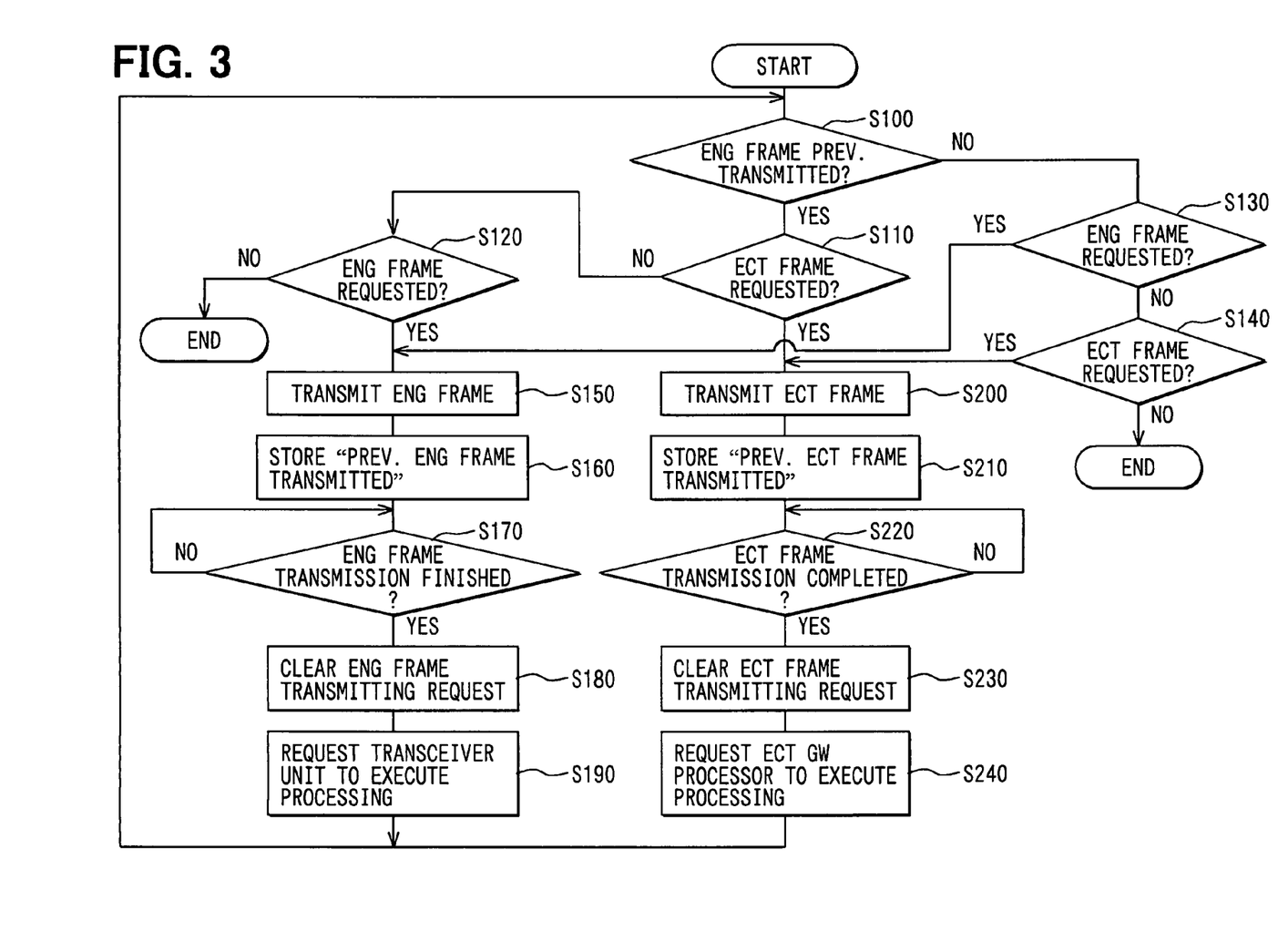
FIG. 3 is a flowchart showing the processing which is periodically executed by a transmission mediating unit 31 in ENG ECU 10.

FIG. 3 is a flowchart showing the processing executed by the transmission mediating unit 31 in ENG ECU 10. This flowchart is repetitively executed every predetermined interval (for example, 1 ms).

First, it is judged in step S100 whether the communication frame which was previously transmitted from the abnormality diagnostic device 90 through the common bus 80 is an ENG frame from the ENG buffer 32. Specifically, in steps S160 and S210 described later, "previous ENG frame transmitted" is stored in the memory when an ENG frame is transmitted from the ENG buffer 32 or "previous ECT frame transmitted" is stored in the memory when an ECT frame is transmitted from the ECT buffer 33. In step S100, it is judged on the basis of the storage state whether the ENG frame was previously transmitted. Since "previous ENG frame transmitted" is not stored immediately after the processing of this routine is started, "No" is judged in step S100.

If it is judged in step S100 that the ENG frame was previously transmitted, the processing goes to step S110. In step S110, since the ENG frame was previously transmitted, in order to transmit an ECT frame from the ECT buffer 33, it is checked whether a request for transmitting the ECT frame is made from the gateway processor 25. The processing in the gateway processor 25 will be described later.

If it is judged that an ECT-frame transmitting request is made from the gateway processor 25, ECT frames to be transmitted to the ECT buffer 33 of the transmission mediating unit 31 are transmitted from the transmission buffer 26 of the gateway processor 25 at S200 and stored in the ECT buffer 33. Therefore, by executing the step S200 and the subsequent steps, the transmission processing of the ECT frames stored in the ECT buffer 33 is executed.

On the other hand, if it is judged in step S110 that no ECT-frame transmitting request is made, the processing goes to step S120. In step S120, it is checked whether an ENG-frame transmitting request is made from the ENG transceiver unit 20. If it is judged that the transmission of all the ENG frames has not yet been completed, the ENG-frame transmitting request is output from the ENG transceiver unit 20. In this case, by executing the processing of the step S150 and the subsequent steps, the transmission of the ENG frames is continued. If the transmission of all the ENG frames is completed, there is no ENG-frame transmitting request from the ENG transceiver unit 20. In this case, the judgment in step S120 is "No", and the processing of this flowchart is finished. The processing of the ENG transceiver unit 20 will be described later.

If it is judged in step S100 that no ENG frame was previously transmitted, in order to transmit ENG frames at present, it is judged in step S130 whether an ENG-frame transmitting request is made from the ENG transceiver unit 20. If it is judged in step S130 that there is an ENG-frame transmitting request, the processing of the step S150 and the subsequent steps is executed to transmit the ENG frames in the same manner as described above.

On the other hand, if it is judged in step S130 that there is no ENG-frame transmitting request, it is checked in step S140 whether there is any ECT-frame transmitting request. At this time, if there is any ECT-frame transmitting request, the processing of the step S200 and the subsequent steps is carried out in the same manner as described above to transmit ECT frames. If the judgment in step S140 is "No", neither ENG-frame transmitting request nor ECT-frame transmitting request exists, and thus the processing of this flowchart is finished.

As described above, according to the flowchart shown in FIG. 3, when ENG frames and ECT frames are required to be transmitted around the same time, the transmission mediating unit 31 carries out the processing of alternately transmitting the ENG frames and the ECT frames. Accordingly, the transmission of both types of frames can be started with no time delay in response to the message creating request from the abnormality diagnostic device 90.

Next, the transmission processing of the ENG frames at the step S150 and the subsequent steps will be described.

First, in step S150, the transmission of the ENG frame stored in the ENG buffer 32 is started. In subsequent step S160, "previously ENG frame transmitted" is stored for use of the judgment in step S100 described above. Instep S170, it is judged whether the transmission of the ENG frame is completed or not, and the processing waits until the transmission of the ENG frame is completed.

When the transmission of the ENG frame is completed, the judgment in step S170 is "YES", and the processing goes to step S180. IN step S180, the ENG-frame transmitting request output from the ENG transceiver unit 20 is cleared. In step S190, the ENG transceiver unit 20 is requested to execute the processing (A) of the ENG transceiver unit 20 shown in FIG. 5A.

Here, the processing (A) of the ENG transceiver unit 20 shown in FIG. 5A will be described.

Through the processing from the step S150 to the step S180, the transmission of the ENG frame stored in the ENG buffer 32 of the transmission mediating unit 31 is set to be completed. Therefore, in the processing (A) of the ENG transceiver unit 20, it is judged whether there is any ENG frame to be further transmitted. If there is some ENG frame to be transmitted, an ENG-frame transmitting request is issued, and also the ENG frame to be transmitted is transmitted from the transmission buffer 21 of the ENG transceiver unit 20 to the ENG buffer 32 of the transmission mediating unit 31.

Figure 5A:
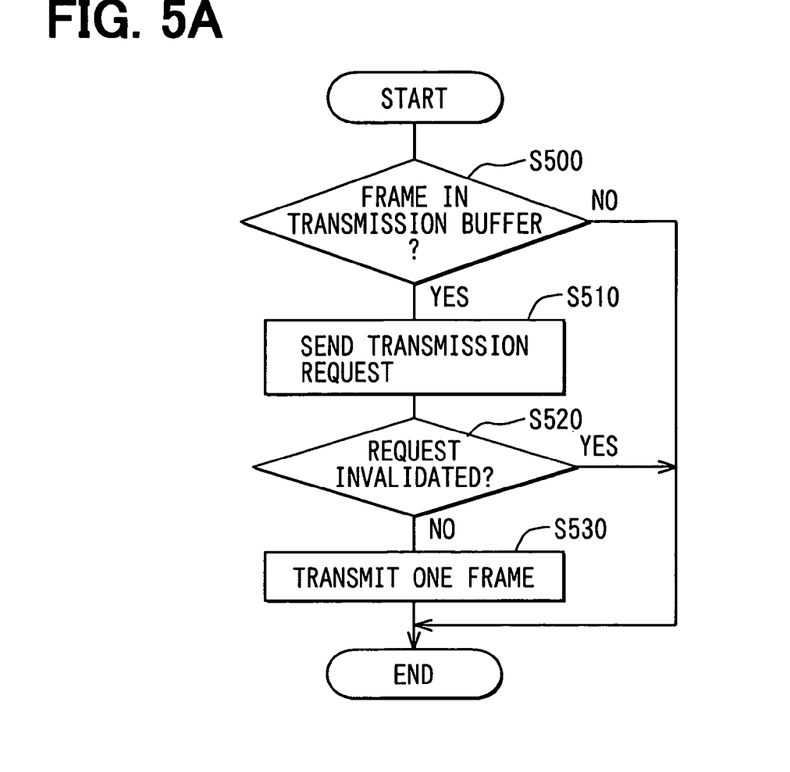
FIG. 5A is a flowchart showing the processing of issuing an ENG-frame transmitting request to the transmission mediating unit 31, which is executed in the transceiver unit 20 for ENG.

That is, in the step S500 of FIG. 5A, it is judged whether any ENG frame exits in the transmission buffer 21 of the ENG transceiver unit 20. If any ENG frame exists in the transmission buffer 21, an ENG-frame transmitting request is issued to the transmission mediating unit 31 in step S510 because it is necessary to transmit the ENG frame concerned. In step S520, it is judged whether this transmitting request is received at the transmission mediating unit 31. If it is received, one ENG frame to be transmitted from the transmission buffer 21 is transmitted to the ENG buffer 32 of the transmission mediating unit 31 at S530. Accordingly, a new ENG frame transmitting request occurs, and thus the processing returns to the step S100 after the step S190 of FIG. 3 is executed, thereby repetitively executing the processing described above. On the other hand, if it is judged in step S520 that a notification indicating invalidity of the transmitting request is received from the transmission mediating unit 31, the processing is finished with no action.

Returning to FIG. 3, the transmission processing of the ECT frame at the step S200 and the subsequent steps is carried out substantially in the same manner as the transmission processing of the ENG frame. That is, the transmission of the ECT frame is started in step S200. In the subsequent step S210, "previous ECT frame transmitted" is stored. In step S220, it is judged whether the transmission of the ECT frame is completed, and the processing waits until the transmission is completed. In step S230, the ECT-frame transmitting request output from the ECT gateway processor 25 is cleared. In step S240, the ECT gateway processor 25 is requested to execute the processing (A) of the ECT gateway processor 25 shown in FIG. 6A.

Figure 6A:
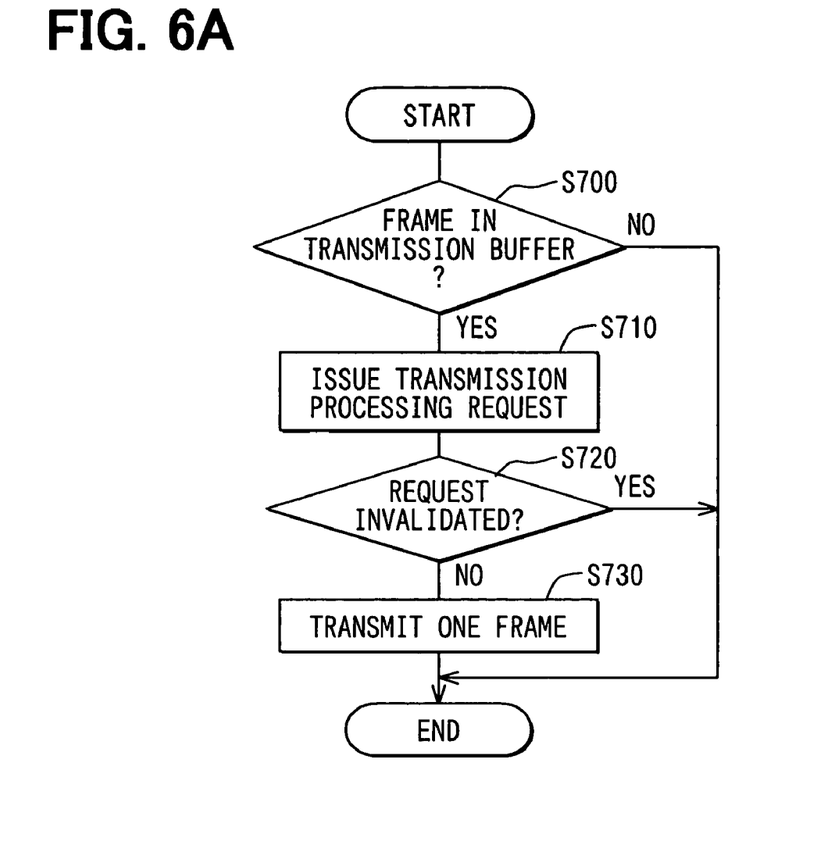
FIG. 6A is a flowchart showing the processing of issuing an ECT-frame transmitting request to the transmission mediating unit 31, which is executed in a gateway processor 25 for ECT.

The processing (A) of the ECT gateway processor shown in FIG. 6A is substantially the same as the processing of the ENG transceiver unit 20 shown in FIG. 5A. That is, in step S700, it is judged whether there is any ECT frame in the transmission buffer 26 of the ECT gateway processor 25. If it is judged that an ECT frame exists in the transmission buffer 26, it is necessary to transmit this ECT frame, and thus an ECT-frame transmitting request is issued to the transmission mediating unit 31 in step S710. In step S720, it is judged whether this transmitting request is received at the transmission mediating unit 31. If the transmitting request is received, one ECT frame to be transmitted from the transmission buffer 26 is transmitted to the ECT buffer 33 of the transmission mediating unit 31. On the other hand, if it is judged in step S720 that a notification indicating invalidity of the transmitting request is received from the transmission mediating unit 31, the processing is finished with no action.

Figure 5B:
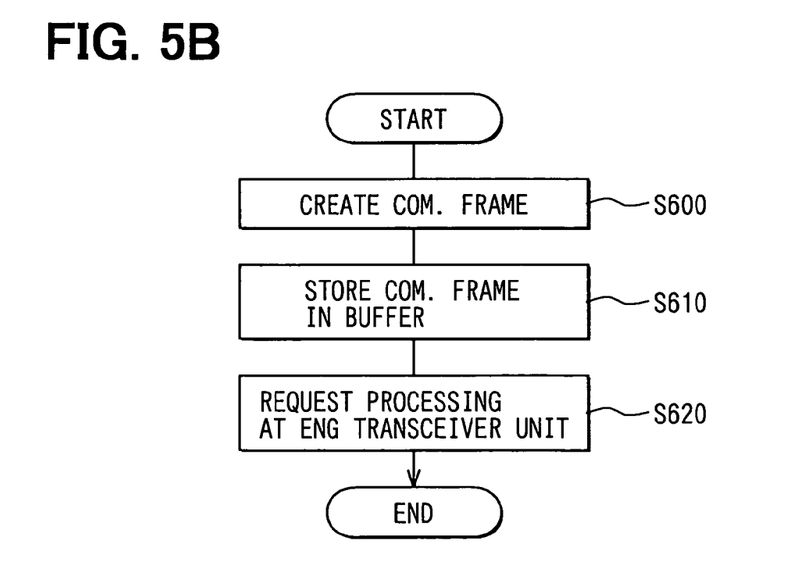
FIG. 5B is a flowchart showing the processing of creating an ENG frame and accumulating the ENG frame thus created in a transmission buffer 21, which is executed in the transceiver 20 for ENG.

The ENG transceiver unit 20 carries out not only the processing (A) described above, but also the processing (B) of dividing a diag-code to be transmitted into plural communication frames when the diag-code to be transmitted is received from the diagnostic unit 15, and accumulating the communication frames thus divided into the transmission buffer 21. The processing (B) of the ENG transceiver unit 20 is shown in the flowchart of FIG. 5B.

First, in step S600, the communication frames are created in conformity with the frame type corresponding to the diag-data length of the diag-code received from the diagnostic unit 15. That is, when the diag-data length is less than 8 bytes, the communication frame is created by a single frame SF, and when the diag-data length is not less than 8 bytes, the communication frames are constructed by a first frame FF and consecutive frames CF. In step S610, the communication frames thus created are successively stored in the transmission buffer 21. In step S620, a request for executing the processing of the ENG transceiver unit 20 shown in FIG. 5A is made to issue an ENG-frame transmitting request to the transmission mediating unit 31 because an ENG frame is accumulated in the transmission buffer 21.

Figure 6B:
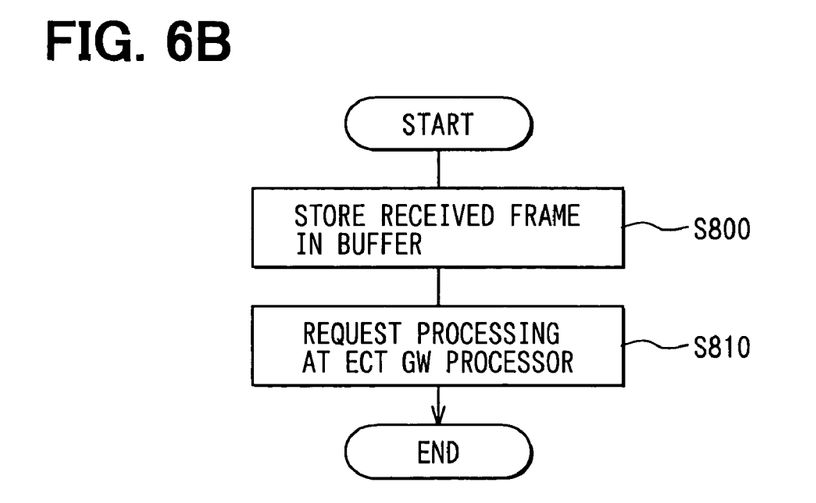
FIG. 6B is a flowchart showing the processing of receiving ECT frame and accumulating the ECT frame thus received in a transmission buffer 26.

The ECT gateway processor 25 also carries out not only the processing (A) described above, but also the processing (B) of accumulating a transmission frame to be transmitted into the transmission buffer 26 when the communication frame to be transmitted is received from the ECT transceiver unit 60. The processing (B) of the ECT gateway processor 25 is shown in FIG. 6B.

First, in step S800, the communication frames received from the ECT transceiver unit 60 are successively stored into the transmission buffer 26 in the receiving order thereof. In step S810, a request for executing the processing (A) of the ECT gateway processor shown in FIG. 6A is made to issue an ECT-frame transmitting request to the transmission mediating unit 31 because the ECT frame is accumulated in the transmission buffer 26.

Figure 4A:
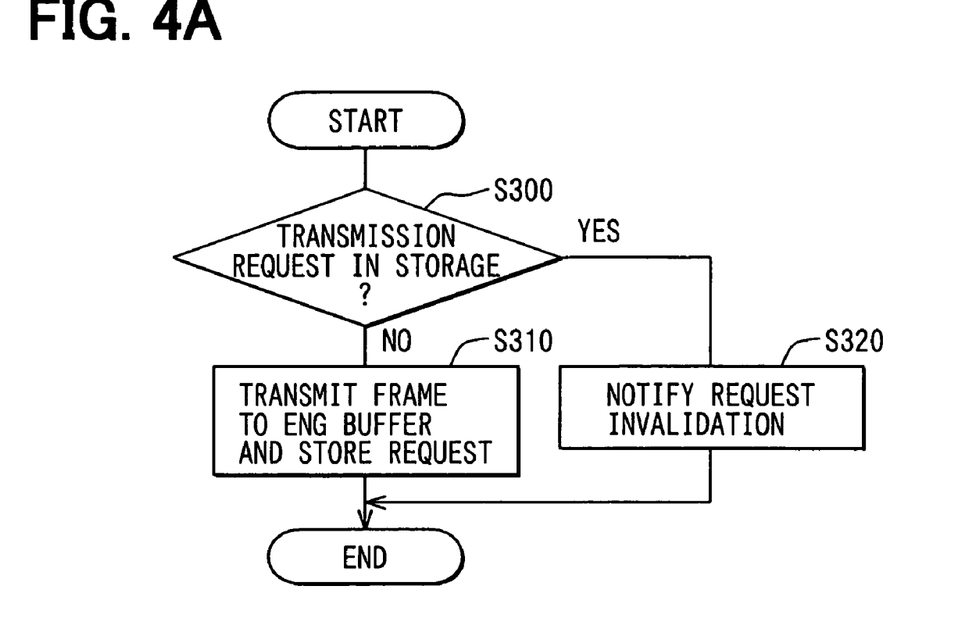
FIG. 4A is a flowchart showing the processing executed in the transmission mediating unit 31 when an ENG frame transmitting request is issued from a transceiver unit 20 for ENG.
Figure 4B:
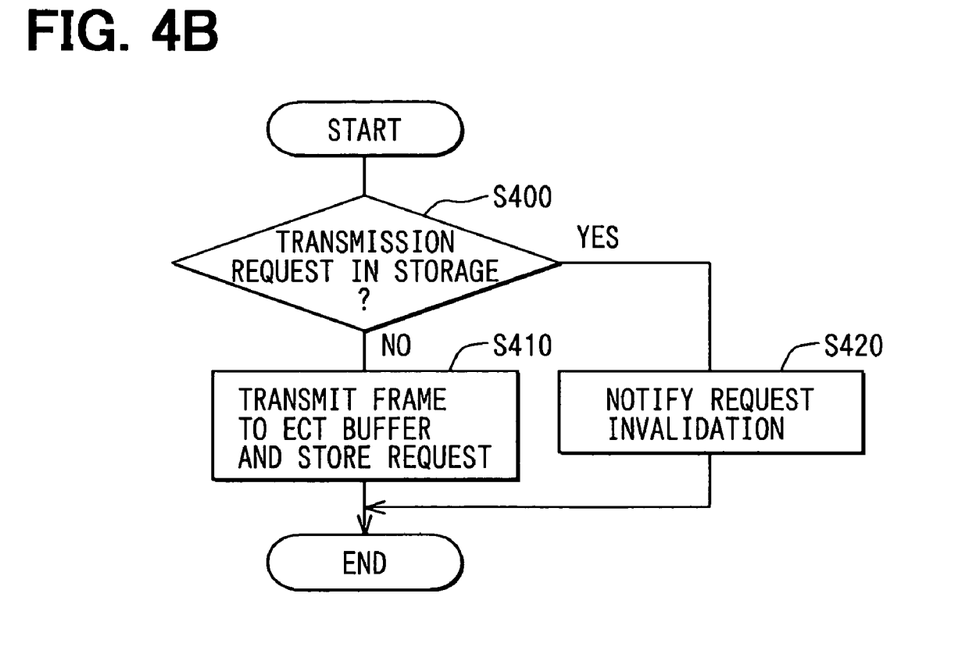
FIG. 4B is a flowchart showing the processing executed in the transmission mediating unit 31 when an ECT frame transmitting request is issued in a gateway processor 25 for ECT.

Here, the transmission mediating unit 31 executes the processing shown in FIG. 4A or 4B when the frame transmitting request is made through the processing (A) of the ENG transceiver unit 20 or the ECT gateway processor 25.

FIG. 4A shows the processing when the ENG frame transmitting request is issued. First, it is judged in step S300 whether the ENG-frame transmitting request is under storage or not. That is, it is judged whether a non-transmitted ENG frame is stored in the ENG buffer 32 of the transmission mediating unit 31 and thus the ENG-frame transmitting request is not to be cleared. In this case, when the ENG-frame transmitting request is under storage, it is impossible to transmit any new ENG frame to the ENG buffer 32. Therefore, in step S320, a transmitting request invalidating notification is sent to the ENG transceiver unit 20.

On the other hand, if the ENG frame has been already transmitted from the ENG buffer 32 of the transmission mediating unit 31 and thus the ENG buffer 32 is allowed to accept a new ENG frame, "No" is judged in step S300. In this case, in step S310, the ENG frame is transmitted from the transmission buffer 21 of the ENG transceiver unit 20 to the ENG buffer 32 of the transmission mediating unit 31, and the ENG-frame transmitting request is stored into the memory.

FIG. 4B shows the processing when the ECT-frame transmitting request is issued. This processing is substantially similar to the processing when the ENG-frame transmitting request described above is issued. That is, in step S400, it is judged whether the ECT-frame transmitting request is under storage. At this time, when it is judged that the ECT-frame transmitting request is under storage, transmission of any new ECT frame to the ECT buffer 33 is prohibited. Therefore, in step S420, a transmitting request invalidating notification is sent to the ECT gateway processor 25. On the other hand, if it is judged in step S400 that the ECT-frame transmitting request is not under storage, in step S410, the ECT frame is transmitted from the transmission buffer 26 of the ECT gateway processor 25 to the ECT buffer 33 of the transmission mediating unit 31, and the ECT-frame transmitting request is stored into the memory.

When the ECT transceiver unit 60 in ECT ECU 50 receives a message creating request from the abnormality diagnostic device 90, it gives it to the diagnostic unit 55 and then receives a diag-code to be transmitted from the diagnostic unit 55. The communication frame corresponding to the diag-code is created, and accumulated in the transmission buffer 61. Furthermore, the communication frames thus accumulated in the transmission buffer 61 are successively transmitted through the dedicated bus 70 to the transmission buffer 26 of the ECT gateway processor 25. The ECT transceiver unit 60 executes only the processing described above, and thus the flowchart concerning this processing is omitted.

Figure 7:
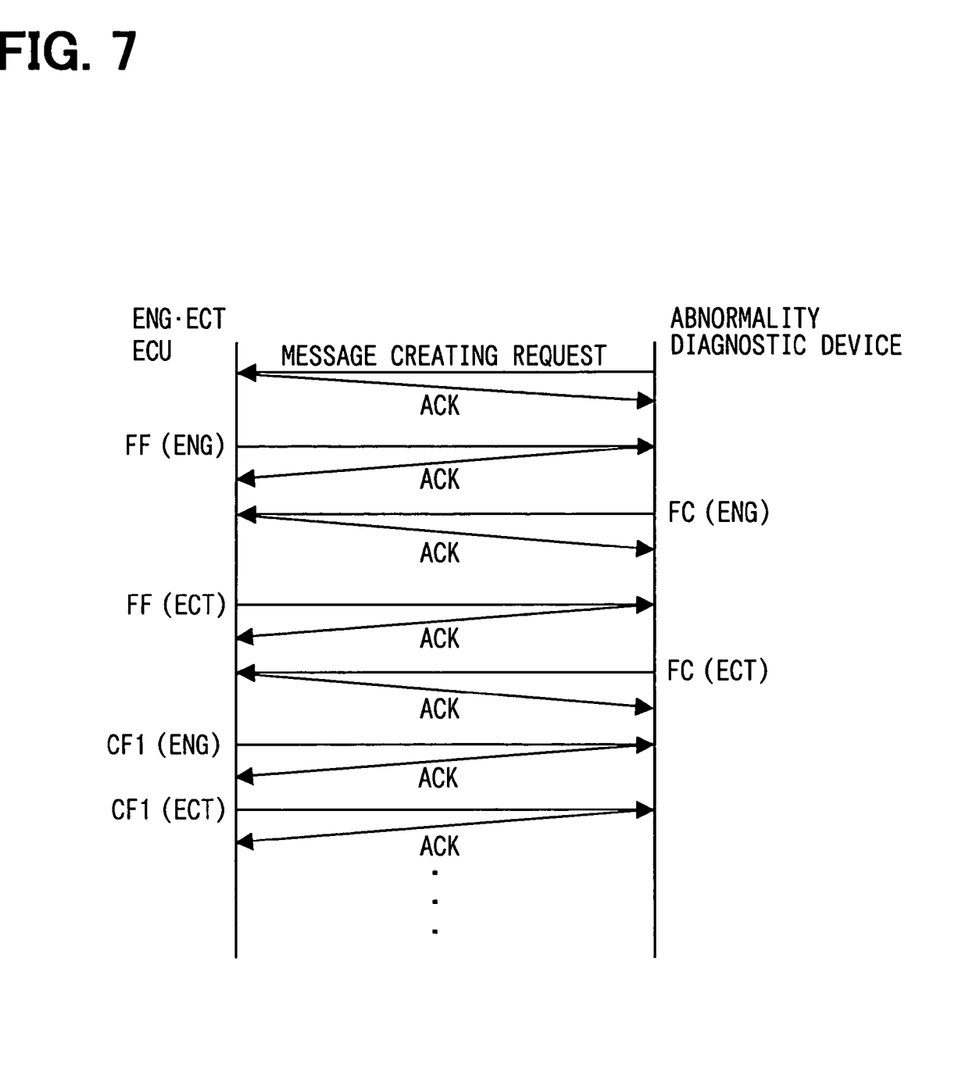
FIG. 7 is a timing diagram showing the communication frame communicated between an abnormality diagnostic device and each of ENG ECU 10 and ECT ECU 50.

According to the processing shown by the flowcharts of FIGS. 3 to 6B, when there occurs such a case that ENG frames and ECT frames are required to be transmitted around the same time, the transmission mediating unit 31 alternately transmits the ENG frames and the ECT frames. FIG. 7 shows a time chart depicting when the ENG frames and the ECT frames are alternately transmitted as successive events depicted starting from the top and progressing in time towards the bottom of FIG. 7.

In the example shown in FIG. 7, the first frame FF (ENG) of ENG frames is first transmitted to the abnormality diagnostic device 90 in response to a message creating request from the abnormality diagnostic device 90, and then the first frame FF (ECT) of ECT frames is transmitted. When each communication frame is transmitted from a transmission source to a transmission destination, the transmission destination returns an acknowledge (ACK) signal to the transmission source.

As shown in FIG. 7, when the abnormality diagnostic device receives the first frame FF (ENG) of the ENG frames, it returns a front control frame FC (ENG). After receiving the front control frame FC (ENG), the transmission mediating unit 31 transmits the first frame FF (ECT) of the ECT frames to the abnormality diagnostic device 90. At this time, the abnormality diagnostic device 90 returns the flow control fame FC (ECT) in response to the first frame FF of the ECT frames.

After receiving the flow control frames FC (ENG) and FC (ECT), the transmission mediating unit 31 alternately transmits each of the consecutive frames CF (ENG) of the ENG frames and each of the consecutive frames CF (ECT) of the ECT frames.

Through the processing of the transmission mediating unit 31 as described above, the transmission of both types of communication frames can be started quickly without favoring either type.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrical control unit for use in a motor driven vehicle, said electrical control unit comprising:
   a communication frame creating unit for creating first communication frames to be transmitted on an external communication bus in response to a request;
   a storage unit for temporarily storing second communication frames received from a second electrical control unit, the second communication frames being subjected to gateway processing by said first-mentioned electrical control unit for transmission to said external communication bus; and
   a transmission mediating unit for transmitting the first and second communication frames to said external communication bus with transmission priority being assigned alternately to first and second frames currently ready for transmission.

2. An electrical control unit as in claim 1, wherein the communication frame creating unit sets a code representing an abnormality content detected by abnormality diagnosis and creates a communication frame corresponding to the abnormality content.

3. An electrical control unit as in claim 2, wherein the electrical control unit controls equipment mounted in a vehicle, and the communication frame creating unit sets a signal representing a state of the equipment as a message and creates a communication frame corresponding to the message.

4. An electrical control unit as in claim 1, wherein the electrical control unit controls equipment mounted in a vehicle, and the communication frame creating unit sets a signal representing a state of the equipment as a message and creates at least one communication frame corresponding to the message.

5. A control system for use in a motor driven vehicle, said system comprising:
   a first electrical control unit for creating first communication frames to be transmitted upon receiving respectively corresponding external requests and for transmitting the first communication frames through a first bus; and
   a second electrical control unit connected to the first electrical control unit through a second bus, wherein the second electrical control unit creates second communication frames to be transmitted in response to respectively corresponding requests from an exterior unit and also transmitted through the first bus via said first electrical control unit, wherein the first electrical control unit includes a transmission mediating unit for transmitting the first and second communication frames to said external communication bus with transmission priority being assigned alternately to first and second frames currently ready for transmission.

6. A control system as in claim 5, wherein each of the first and second electrical control units creates the first and second communication frames based upon external requests received from the first bus.

7. A control system as in claim 6, wherein each of the first and second electrical control units transmits a code representing an abnormality content detected through abnormality diagnosis as a message upon receiving an external request for such information.

8. A control system as in claim 7, wherein the first and second electrical control units are constructed for controlling the driving state of an engine of a vehicle and for controlling an automatic transmission of the vehicle.

9. A control system as in claim 6, wherein the first and second electrical control units are constructed for controlling the driving state of an engine of a vehicle and for controlling an automatic transmission of the vehicle.

10. A control system as in claim 5, wherein the first and second electrical control units are constructed for controlling the driving state of an engine of a vehicle and for controlling an automatic transmission of the vehicle.

11. A method for mediating transmission of data frames from two direct bus-connected vehicular electronic control units onto a common bus connected to only one of said electronic control units, requested data being provided from both of said vehicular electronic control units to another vehicular electronic unit over said common bus, said method comprising:

responding to requests for data received on said common bus by generating responsive first and second frames respectively generated by said two directly connected vehicular electronic control units;

buffering said first and second frames of data at the vehicular electronic control unit that is connected to said common bus;

transmitting said first and second frames of data with transmission priority being assigned alternately to first and second frames currently ready for transmission.

12. A method as in claim 11, wherein said another vehicular electronic unit comprises a diagnostic unit which sends requests for state data to said directly connected electronic control units.

13. A method as in claim 12, wherein said directly connected electronic control units respectively control (a) an engine providing motive power to a vehicle and (b) an electrically controlled transmission disposed in a vehicular drive train.

* * * * *